April 25, 1939.  H. C. SWIFT  2,156,205

FLUID PRESSURE BRAKING SYSTEM

Filed June 11, 1938

INVENTOR.
HARVEY C. SWIFT
BY *J. H. Fowler*
ATTORNEY.

Patented Apr. 25, 1939

2,156,205

UNITED STATES PATENT OFFICE 2,156,205

FLUID PRESSURE BRAKING SYSTEM

Harvey C. Swift, Detroit, Mich., assignor to Hydraulic Brake Company, Detroit, Mich., a corporation of California Application June 11, 1938, Serial No. 213,258

6 Claims. (Cl. 60—54.6)

This invention relates to fluid pressure braking systems, and more particularly to fluid pressure producing devices for such systems.

Broadly the invention comprehends a fluid pressure braking system comprising a fluid pressure producing device including a cylinder, and a piston movable in the cylinder for creating pressure on the fluid in the system. In devices of this type the practice has been to provide the cylinder with a supply port and a compensating port. The latter is generally located just forward of a sealing cup carried on the head of the piston, that is, when the piston is in fully retracted position. Accordingly, when the piston moves on its compression stroke the pressure on the fluid in the system forward of the piston forces the flange of the cup into the compensating port, resulting in injury to the cup. The present invention aims to overcome this difficulty.

An object of the invention is to provide a fluid pressure producing device so constructed as to eliminate the conventional compensating port.

Another object of the invention is to provide a fluid pressure producing device operative to automatically compensate for expansion and contraction of the fluid in the system due to temperature changes.

Other objects and advantages of the invention will appear from the following description taken in connection with the accompanying drawing, in which—

Figure 1:
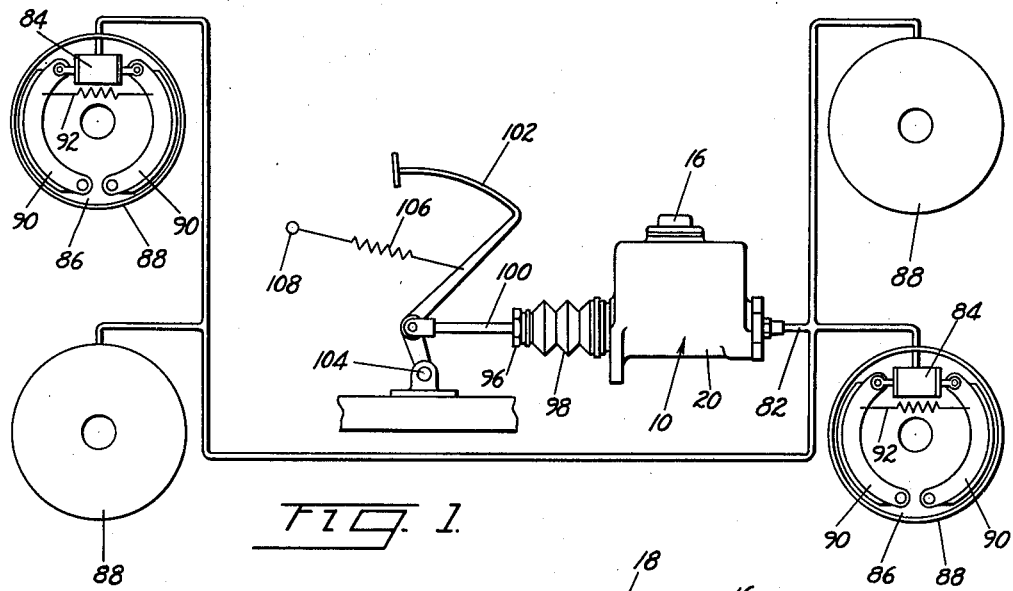
Fig. 1 is a schematic view of a fluid pressure braking system embodying the invention.
Figure 2:
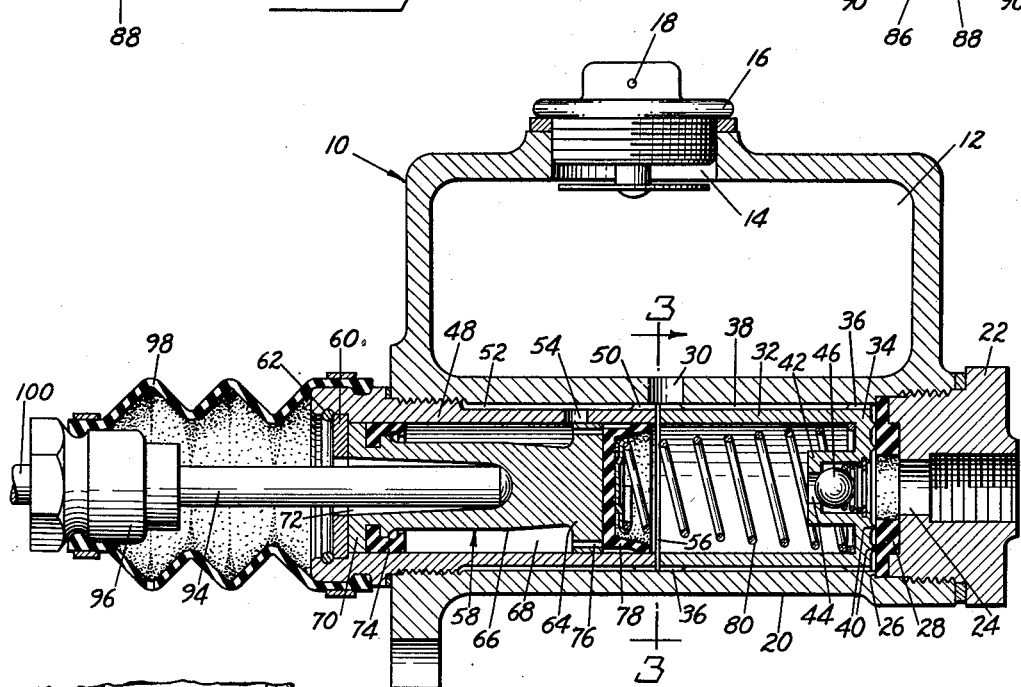
Fig. 2 is a vertical sectional view of the fluid pressure producing device.
Figure 3:
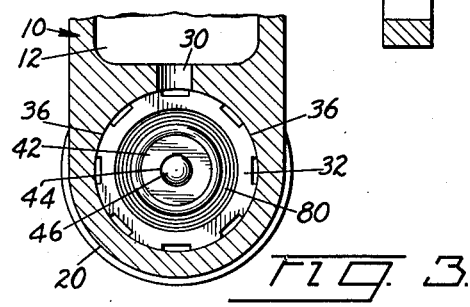
Fig. 3 is a sectional view substantially on line 3—3, Fig. 2.

Referring to the drawing for more specific details of the invention, 10 represents generally a fluid pressure producing device including a reservoir 12 having a filling opening 14 normally closed as by a plug 16 having openings 18 therethrough for venting the reservoir to the atmosphere.

The reservoir has formed at its base a cylinder 20 open at one end and closed at its other end as by a head 22 having a discharge port 24. An annular shoulder 26 in the wall of the cylinder adjacent the closed end thereof has seated thereon a flexible washer 28 provided with a concentric opening registering with the discharge port 24. The washer is supported by the head and is clamped upon the shoulder by an annular flange on the head. The cylinder also has arranged in its wall substantially centrally of its length a port 30 providing a communication between the reservoir and the cylinder.

A shell 32 open at one end and closed at its other end as by a head 34 is mounted for reciprocation in the cylinder. The overall diameter of the shell is slightly smaller than the bore of the cylinder, and the shell is supported concentrically of the cylinder by a plurality of equally spaced lands 36 on the respective ends thereof, so as to provide a passage 38 for free movement of fluid between the shell and the cylinder. The head 34 of the shell has thereon annular beads 40 adapted to sink into the flexible washer 28 and effectively seal the passage 38. The head also has arranged concentrically thereon a valve chamber 42 opening through the face of the head. The valve chamber has a port 44 communicating with the interior of the shell, and a spring-pressed ball valve 46 in the chamber controls the port.

A sleeve 48 fixedly mounted in the open end of the cylinder has a portion of smaller outer diameter than the bore of the cylinder supported concentrically of the cylinder by a plurality of spaced lands 50 on the free end thereof so as to provide a fluid passage 52, and arranged in the wall of the sleeve 48 is a port 54 providing a communication between the passage 52 and the interior of the sleeve. The sleeve 48 is supported in alignment with the shell 32, and the adjacent ends of the sleeve and shell are normally spaced apart to provide a gap 56 providing a communication between the passages 38 and 52 and the interiors of the sleeve and shell.

A piston 58 reciprocable in the sleeve and shell is held against displacement by a washer 60 seated on an annular shoulder in the wall of the sleeve 48 adjacent the outer end of the sleeve, and a retaining ring 62 seated in a groove in the wall of the sleeve secures the washer in place.

The piston includes a head 64, a reduced body portion 66 providing in conjunction with the sleeve and/or shell an annular chamber 68, and a skirt 70 provided with a concentric socket 72 extended into the body portion 66. The skirt carries a sealing cup 74 for inhibiting seepage of fluid from the sleeve past the piston, and the head has a plurality of spaced passages 76 therethrough providing communication between the annular chamber 68 and those portions of the sleeve and/or shell forward of the piston. A sealing cup 78 seated on the head of the piston controls the passages 76 through the head of the piston, and a spring 80 interposed between the sealing cup and the back of the head 34 of the shell serves to retain the valve and shell against displacement and also to return the piston to its retracted position.

A fluid pressure delivery pipe or conduit 82 connected to the discharge port 24 in the head of the cylinder has branches connected respectively to fluid pressure actuated motors 84, preferably arranged in pairs, one pair for actuating the brakes associated with the front wheels of the vehicle, and another pair for actuating the brakes associated with the rear wheels of the vehicle.

As shown, the brakes are of a preferred type including a fixed support or backing plate 86 adapted to be secured to an axle or to an axle housing, a rotatable drum 88 associated with the backing plate adapted to be secured to a wheel, a pair of corresponding interchangeable friction elements or shoes 90 pivoted on the backing plate for cooperation with the drum, a retractile spring 92 connecting the shoes, and a motor corresponding to the motors 84 mounted on the backing plate between the shoes and operative to actuate the shoes into engagement with the drum against the resistance of the retractile spring.

The recess 72 in the piston 58 receives one end of a thrust pin 94, and the other end of the pin is received by a coupling 96 connected by a flexible dust shield or boot 98 to the outer end of the sleeve 48, and the coupling 96 is connected to a thrust rod 100 pivoted to a foot pedal lever 102 rockably mounted on a stub shaft 104 and connected by a retractile spring 106 to a fixed support 108.

In a normal operation, upon depressing the foot pedal lever 102, force is transmitted therefrom through the rod 100, the coupling 96, and the thrust pin 94, to the piston 58, resulting in moving the piston on its compression stroke. During the initial movement of the piston 58 on its compression stroke the sealing cup 79 thereon closes the gap 58, and thereafter, as the piston advances, the pressure on the fluid in the shell 32 cracks the valve 46, and the fluid in the shell is displaced therefrom past the valve 46 into the valve chamber 42, thence through the discharge port 24 and the fluid pressure delivery pipe 82 and its respective branches into the fluid pressure actuated motors 84, causing energization of the motors, resulting in actuation of the respective brakes.

Upon the conclusion of a braking operation, the foot pedal lever 102 is released and returns to its retracted position under the influence of the retractile spring 106. As the pedal returns to its retracted position, it retracts the rod 100 and thrust pin 94, resulting in release of the piston 58, whereupon the piston is returned to its retracted position under the influence of the retractile spring 80.

As the piston returns to its retracted position, a partial vacuum is created in the shell 32. This results in drawing fluid from the reservoir 12, through the port 30, into the passages 38 and 52, thence through the port 54 and gap 56 into the annular chamber 68, thence through the passages 76 in the head of the piston, past the sealing cup 78, into the shell 32, completely filling the shell.

As the piston nears its retracted position, the tension on the retractile spring 80 is surpassed by the pressure on the fluid in the delivery pipe 82, its respective branches, and the fluid pressure motors 84 connected to the branches, induced by the tension on the retractile springs 92 connected between the shoes of the respective brakes. This results in movement of the shell 32 from its seat on the washer 28 against the sleeve 48, thereby closing the gap 56, and establishing communication between the discharge port 24 and the reservoir by way of the passage 38 and port 30.

The fluid is returned to the reservoir against the resistance of the retractile spring 80, and this spring is loaded to maintain a predetermined pressure on the fluid in the system between the fluid pressure producing device and the fluid pressure actuated motors so that lost motion in operation of the system may be avoided. The shell 32 and valve 46 in the head of the shell provide in effect a two-way valve for control of the discharge port operative to compensate for expansion and contraction of the fluid in the system due to temperature changes.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is,—

1. A fluid pressure producing device comprising a reservoir, a cylinder supplied therefrom having one of its ends open and its other end closed by a head provided with a discharge port, a sleeve secured in the open end extending inwardly of the cylinder, a shell supported for reciprocation in the cylinder having a controlled port registering with the discharge port, and a piston reciprocable in the sleeve and shell.

2. A fluid pressure producing device comprising a reservoir, a cylinder supplied therefrom having one of its ends open and its other end closed by a head having a discharge port, a sleeve fixedly secured in the open end extending inwardly concentrically of and in spaced relation to the cylinder, a shell mounted in the cylinder concentrically of and in spaced relation thereto and movable between the sleeve and the head, a controlled port in the head of the shell registering with the discharge port, and a piston reciprocable in the sleeve and shell.

3. A fluid pressure producing device comprising a reservoir, a cylinder communicating therewith having an open end and a closed end provided with a discharge port, a sleeve fixedly secured in the open end extending inwardly of the cylinder having an outer diameter less than the bore of the cylinder and a port in its wall, a shell in the cylinder movable between the sleeve and the closed end of the cylinder having an outer diameter smaller than the bore of the cylinder and a port in its head registering with the discharge port, a valve controlling the port in the shell, and a piston reciprocable in the sleeve and shell.

4. A fluid pressure producing device comprising a reservoir, a cylinder communicating therewith having one of its ends open and its other end closed by a head provided with a discharge port, a sleeve fixedly secured in the open end extending inwardly concentrically of and in spaced relation to the bore of the cylinder, said sleeve having a port in its wall, a shell mounted for reciprocation in the cylinder between the sleeve and the head concentrically to and in spaced relation to the bore of the cylinder, said shell having a port in its head, a valve controlling the port in the head of the shell, and a piston reciprocable in the sleeve and shell.

5. A fluid pressure producing device comprising a reservoir, a cylinder communicating therewith having one of its ends closed by a head provided with a discharge port, a flexible washer supported on the head, a sleeve fixedly secured in the open end of the cylinder extending inwardly thereof concentrically of and in spaced relation to the bore of the cylinder, said sleeve having a port in its wall, a shell mounted for reciprocation in the cylinder concentrically of and in spaced relation to the bore of the cylinder, said shell having one of its ends open and its other end closed by a head adapted to seat on the flexible washer, a valve in the head of the shell, and a piston reciprocable in the sleeve and shell.

6. A fluid pressure producing device comprising a reservoir, a cylinder supplied therefrom having one of its ends open and its other end closed as by a head provided with a discharge port, a flexible washer supported on the head, a sleeve fixedly secured in the open end of the cylinder extending inwardly thereof concentrically and in spaced relation to the bore of the cylinder, said sleeve having a port in its wall, a shell mounted for reciprocation in the cylinder between the sleeve and the washer concentrically of and in spaced relation to the bore of the cylinder, said sleeve having an open end registering with the inner end of the sleeve and a closed end normally seated on the washer having a controlled port registering with the discharge port, a piston reciprocable in the sleeve and shell, a spring interposed between the piston and the closed end of the shell, and means for actuating the piston.

HARVEY C. SWIFT.